US012709928B2

(12) United States Patent
Holm et al.

(10) Patent No.: US 12,709,928 B2
(45) Date of Patent: Aug. 18, 2026

(54) HINGE FOR A ROOF WINDOW AND ROOF WINDOW WITH A SET OF HINGES

(71) Applicant: VKR Holding A/S, Hørsholm (DK)

(72) Inventors: Michael Galsgård Holm, Roskilde (DK); Terkel Øhlenschlæger, Vanløse (DK)

(73) Assignee: VKR Holding A/S (DK)

( * ) Notice: Subject to any disclaimer, the term of this patent is extended or adjusted under 35 U.S.C. 154(b) by 230 days.

(21) Appl. No.: 18/288,385

(22) PCT Filed: Apr. 29, 2022

(86) PCT No.: PCT/DK2022/050087
§ 371 (c)(1),
(2) Date: Oct. 26, 2023

(87) PCT Pub. No.: WO2022/228633
PCT Pub. Date: Nov. 3, 2022

(65) Prior Publication Data
US 2024/0209669 A1 Jun. 27, 2024

(30) Foreign Application Priority Data
Apr. 29, 2021 (DK) ........................... PA 2021 70197

(51) Int. Cl.
*E05D 7/084* (2006.01)
*E05D 7/082* (2006.01)
(Continued)

(52) U.S. Cl.
CPC ............. *E05D 7/084* (2013.01); *E05D 7/082* (2013.01); *E05D 7/085* (2013.01); *E05F 1/1284* (2013.01);
(Continued)

(58) Field of Classification Search
CPC E05D 3/18; E05D 3/183; E05D 3/186; E05D 3/14; E05D 3/16; E05D 2003/163;
(Continued)

(56) References Cited

U.S. PATENT DOCUMENTS 1,772,559 A * 8/1930 Soss .......................... E05D 3/14 16/379
2,287,563 A * 6/1942 Persson ................... E05D 7/084 16/335
(Continued)

FOREIGN PATENT DOCUMENTS

AU 431315 3/1969
DE 868706 2/1953
(Continued)

OTHER PUBLICATIONS

International Search Report dated Jul. 28, 2022 issued in connection with International Application No. PCT/DK2022/050087, two (2) pages.
(Continued)

*Primary Examiner* — Jeffrey O'Brien
(74) *Attorney, Agent, or Firm* — Merek, Blackmon & Voorhees, LLC

(57) ABSTRACT

In the roof window, each hinge (310) of the set of hinges comprises a frame hinge part (330), a sash hinge part (340), and a movement supporting assembly comprising guiding means including a linkage mechanism with at least two links (350, 360) providing connection between the sash hinge part and the frame hinge part. Each link is connected to at least one of the frame hinge part and the sash hinge part at a joint and connected to each other. A force transmission device (370) is provided for exerting lifting assistance to the movement of the sash (2) relative to the frame (1) during opening of the roof window in the mounted condition of the hinge (310). The force transmission device is provided with
(Continued)

biasing means selected from the group comprising leaf springs, torsion springs and tension/compression springs. The force transmission device (370) may comprise a pick-up (371) biased by a leaf spring (372) connected to the frame hinge part (330) or the sash hinge part (340) by means of a fastening protrusion (375*a*) and/or a first abutment protrusion (375*b*) and/or a second abutment protrusion (375*c*).

11 Claims, 14 Drawing Sheets

(51) Int. Cl.
*E05D 7/085* (2006.01)
*E05F 1/12* (2006.01)
*E04D 13/035* (2006.01)
*E05D 7/086* (2006.01)
*E05D 11/08* (2006.01)

(52) U.S. Cl.
CPC ...... *E04D 13/0354* (2013.01); *E04D 13/0357* (2013.01); *E05D 7/086* (2013.01); *E05D 11/08* (2013.01); *E05F 1/1269* (2013.01); *E05Y 2201/624* (2013.01); *E05Y 2201/708* (2013.01); *E05Y 2900/152* (2013.01)

(58) Field of Classification Search
CPC ... E05D 2003/166; E05D 7/082; E05D 7/084; E05D 7/085; E05D 7/086; E05Y 2900/152; E05F 1/1284
See application file for complete search history.

(56) References Cited

U.S. PATENT DOCUMENTS 3,432,879 A * 3/1969 Henry, Jr. ............ E05F 1/1284 16/336
3,673,635 A * 7/1972 Cencioni ................... E05D 3/06 16/358
3,979,791 A * 9/1976 Collin ..................... E05D 7/086 16/342
4,065,829 A * 1/1978 Lautenschlager ... E05D 11/1021 16/294
4,446,597 A * 5/1984 Dantzer-Sorensen ....................... E05D 7/085 16/370
4,796,331 A * 1/1989 White ................. E05D 11/1007 16/334
5,271,124 A * 12/1993 Sandell ................... E05D 7/085 16/370
6,230,364 B1 * 5/2001 Cheal ...................... E05D 3/145 16/288
7,966,695 B2 * 6/2011 Salice ................... E05F 1/1284 16/335
8,214,973 B2 * 7/2012 Salice ................... E05F 1/1284 16/284
10,100,571 B2 * 10/2018 Deman ................... E05D 3/186
10,287,809 B2 * 5/2019 Holm ...................... E05D 11/00
10,494,849 B2 * 12/2019 Lambertini ......... E05D 15/5211
11,028,627 B2 * 6/2021 Øhlenschlæger ......... E05D 3/18
12,173,504 B2 * 12/2024 Holm .................. E04D 13/0354
2009/0241292 A1 * 10/2009 Wang ...................... G06F 1/181 16/221
2012/0186042 A1 * 7/2012 Salice ..................... E05F 5/006 16/302
2024/0209665 A1 * 6/2024 Holm ...................... E05D 7/082
2024/0218720 A1 * 7/2024 Holm ...................... E05D 7/086
2024/0328223 A1 * 10/2024 Loperfido ............... E05D 11/06

FOREIGN PATENT DOCUMENTS

| | | |
|---|---|---|
| DK | 114321 | 6/1969 |
| EP | 0022657 | 1/1981 |
| EP | 0089813 | 3/1983 |
| EP | 0733146 | 9/1996 |
| EP | 1038083 | 9/2000 |
| EP | 1781883 | 5/2007 |
| EP | 1873323 | 1/2008 |
| EP | 17151385 | 11/2013 |
| EP | 2762665 | 8/2014 |
| EP | 2770146 | 8/2014 |
| EP | 2770149 | 8/2014 |
| EP | 2245242 | 10/2015 |
| EP | 3252255 | 12/2017 |
| WO | WO08910460 | 11/1989 |
| WO | WO2017076416 | 5/2017 |
| WO | WO2018202915 | 11/2018 |
| WO | WO2019101281 | 5/2019 |
| WO | WO2021006096 | 1/2021 |

OTHER PUBLICATIONS

Danish Search Report dated Oct. 22, 2021 issued in connection with Danish Patent Application No. PA 2021 70197, four (4) pages.
Danish Examination Report dated Nov. 7, 2022 issued in connection with Danish Patent Application No. PA 2021 70197, seven (7) pages.
U.S. Appl. No. 18/288,303, filed Oct. 25, 2023 for “Hinge for a Roof Window and Roof Window With a Set of Hinges”.
U.S. Appl. No. 18/288,387, filed Oct. 26, 2023 for “Hinge for a Roof Window and Roof Window With a Set of Hinges”.
U.S. Appl. No. 18/288,388, filed Oct. 26, 2023 for “Roof Window With a Set of Hinges”.

* cited by examiner

HINGE FOR A ROOF WINDOW AND ROOF WINDOW WITH A SET OF HINGES

TECHNICAL FIELD

The present invention relates to a hinge for a roof window with a stationary primary frame having a plurality of frame members including at least two opposing side members, and at least one secondary frame including a sash having a plurality of sash members including at least two opposing side members and optionally an intermediate frame, said hinge being configured to be connected to the primary frame or to the intermediate frame and to the secondary frame sash to define a hinge axis of the roof window, said hinge comprising a frame hinge part, a sash hinge part, and a movement supporting assembly comprising guiding means configured to allow the sash hinge part to assume an angle relative to the frame hinge part substantially around said hinge axis during an opening movement from a closed position to an open position and during a closing movement from the open position to the closed position, the guiding means comprising a linkage mechanism including at least two links providing connection between the sash hinge part and the frame hinge part, each link being connected to at least one of the frame hinge part and the sash hinge part at a joint and connected to each other, the frame hinge part comprising a base plate defining a hinge plane substantially perpendicular to the hinge axis of the roof window and the sash hinge part comprising a base plate substantially parallel to the base plate of the frame hinge part. The invention furthermore relates to a roof window including a set of hinges.

BACKGROUND ART

Windows for installation in an inclined roof surface may be provided in a number of varieties and include more or less complicated operational structures to allow opening of the sash and to fulfil other functions, such as ventilation. Such roof windows include the pivoting type hinged at or near the centre, the top-hinged type, and finally the roof windows that are top-hinged during normal operation but which pivot for cleaning. Roof windows of the top-hinged type have a primary hinge axis provided by a top hinge and pivot for cleaning by means of an intermediate frame in which the sash is hinged to provide a secondary hinge axis.

Basically, the hinges in such a window need to fulfil a number of requirements, in particular with regard to the movement pattern required to allow an overlap between the cover members fastened to the frame and the counterpart cover members fastened to the sash to be established in the closed position of the roof window. To improve the user experience, lifting assistance by force transmission to selected parts of the hinge may be provided to assist in particular the opening movement. Furthermore, braking means may be provided to modulate the movement of the sash during opening and closing and/or to render parking of the sash in arbitrary open positions easy and uncomplicated. Typically, one hinge will be located at either side of the roof window to define a substantially horizontal hinge axis.

One very well-proven type of hinge providing the required pattern of movements is the pivot hinge, which includes a guidance on the frame hinge part cooperating with a slide rail on the sash hinge part. Such pivot hinges are for instance disclosed in Applicant's EP 1 038 083 B1 and EP 1 781 883 B1 and are very versatile as regards operational areas and adaptation of components. Examples of roof windows incorporating such adapted hinges are shown in Applicant's published European patent applications EP 2 770 146 A1 and EP 2 770 149 A1.

However, as an alternative to the traditional pivot hinges in certain fields of application, so-called pantograph hinges are known, in which the desired pattern of movements is provided by a linkage mechanism. The use of hinges including linkage mechanisms is traditionally most often known from the furniture field, but such hinges are also well-known to use for roof windows. Prior art examples include Danish patent No. 114 321, U.S. Pat. No. 4,446,597, and Applicant's European patents EP 22 657 B1 and EP 89 813 B1. In a modern update of this so-called pantograph hinge, Applicant's international published application WO 2017/076416 A1 presents a hinge of the kind mentioned in the introduction.

Although the hinges in the above examples are to some extent capable of providing the kinetic and kinematic performances aimed at, there is still room for improvement.

SUMMARY OF INVENTION

With this background it is an object of the present invention to improve a hinge of the kind mentioned in the introduction with respect to controlling the output forces of the linkage mechanism of the hinge and enabling its relative movement and ease of operability.

This is achieved with a hinge of the kind mentioned in the introduction, which is further characterised in that the at least two links of the linkage mechanism are connected to each other in a bearing axle and the at least two links comprise a sash link providing connection between the bearing axle and the frame hinge part, and a frame link providing connection between the bearing axle and the sash hinge part, and that a force transmission device is provided for exerting lifting assistance to the movement of the sash relative to the frame during opening of the roof window in the mounted condition of the hinge, and that said force transmission device is provided with biasing means selected from the group comprising leaf springs, torsion springs and tension/compression springs.

By providing a force transmission device, the movement of the sash and the opening of the roof window may be facilitated, thus allowing for a safer operation of the roof window while modulating the opening movement.

By the term "link" it is to be understood an element in the form of a substantially rigid body retaining its shape throughout its motion.

The bearing axle enables a rotational relative movement between the links and is not fixed relative to any of the hinge parts and is thus able to move freely during the opening and closing movements. The links are therefore movable relative to the respective base plates of the hinge parts. In this way, a compact configuration of the hinge is achieved while maintaining suitable degrees of freedom.

In addition, the frame hinge part comprises a base plate defining a hinge plane substantially perpendicular to the hinge axis of the roof window and the sash hinge part comprises a base plate substantially parallel to the base plate of the frame hinge part. In this way, transverse movements perpendicular to the hinge plane are avoided and therefore, the durability of the hinge is enhanced.

Other presently preferred embodiments and further advantages will be apparent from the subsequent detailed description and drawings.

BRIEF DESCRIPTION OF DRAWINGS

In the following description, embodiments of the invention will be described with reference to the drawings, in which.

DESCRIPTION OF EMBODIMENTS

Figure 1:
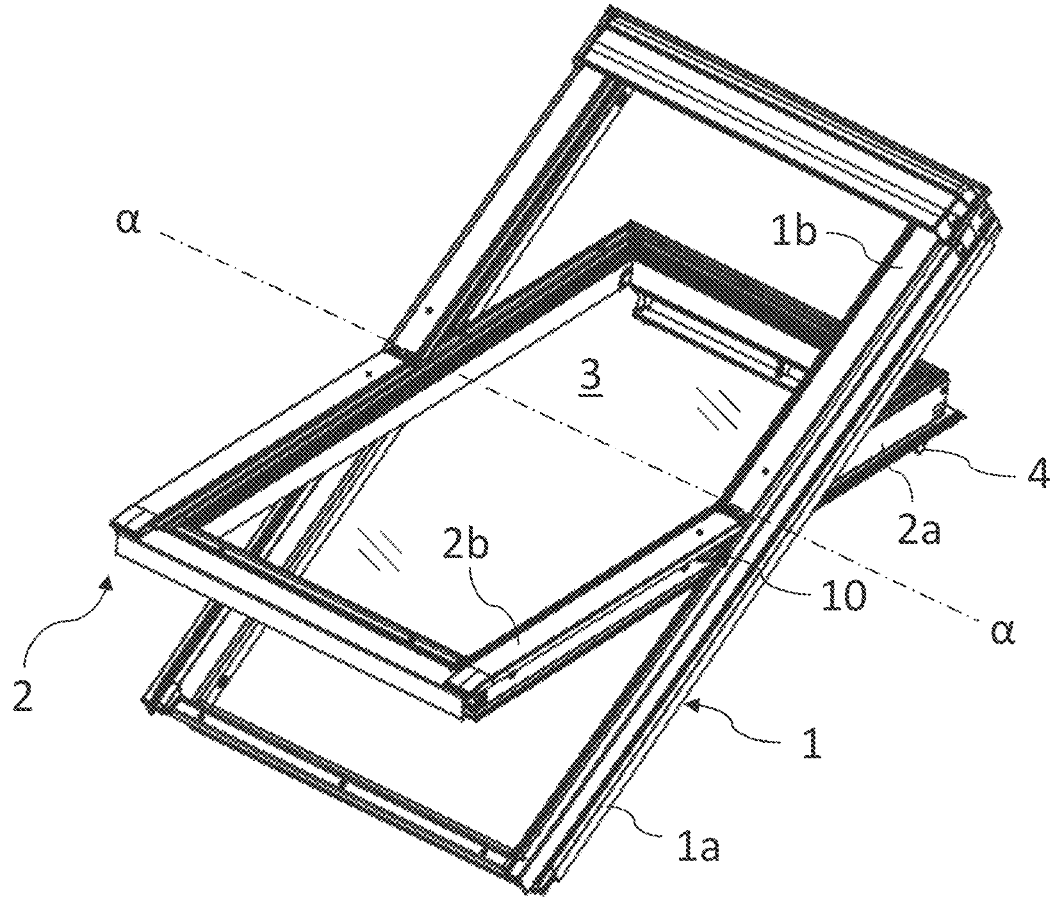
FIG. 1 is a perspective view of a roof window according to the invention.

In the following, embodiments of the inventive hinge and roof window will be described in further detail. When referring to the Figures, the terms up, down, upwards, downwards, top and bottom are taken relative to how the figures are displayed. A front view is taken from the hinge and viewing towards the frame. A view from behind is therefore taken as viewed from the frame towards the hinge. A longitudinal direction is, if nothing else is mentioned, longitudinal along the length of a member. It is to be understood that the arrangement shown in a horizontal orientation is not the normal orientation as the window is installed in an inclined roof.

Throughout the description of embodiments, reference will be made to a hinge carrying reference numerals 10; 110; 210; 310; 710; 810; 910. The hinge 10 shown in its mounted condition in a roof window is representative for all embodiments, and any one of the hinges 110; 210; 310; 710; 810; 910 may thus be put in the place of the hinge 10 shown in FIG. 1. While there may be differences between the embodiments, elements having the same or analogous function are denoted by the same reference numerals to which 100, 200 . . . has been added.

FIG. 1

Initially, reference is made to FIG. 1 in which a roof window according to the invention is shown, including a set of hinges of which one hinge 10 is indicated. The hinge 10 is representative of the hinges of the below embodiments.

In a manner known per se, the window comprises a sash 2 carrying a glazing in the form of a pane 3 and a stationary primary frame 1. The window is intended to be built into a surface, which is inclined with respect to the horizontal, typically a roof, and the window will in the following be referred to as roof window. At a position between the top and centre of the window, there is a hinge connection between the frame 1 and the sash 2. The frame 1 and sash 2 are each formed by four members of which one frame side member 1*a* and one sash side member 2*a* are indicated. The sash 2 is openable with respect to the frame 1, as the sash 2 may be moved from a closed position, in which e.g. the sash side member 2*a* is substantially parallel with the frame side member 1*a*, to an open position, in which the sash side member 2*a* forms an angle with the frame side member 1*a*. During this movement the sash 2 rotates about a hinge axis a situated at the hinge connection. As indicated in FIG. 1, the hinge axis a is located substantially at a centre axis of the roof window, as seen in the height direction. Other positions of the hinge axis are of course conceivable, for instance further upwards towards the top of the roof window. A corresponding operation of the window as described above and from here on is also true for the type of hinge described in the Applicant's international application published under WO 2017/076416 A1.

To protect the interior and the components of the window itself and to ascertain weather-proof transition to the surrounding roofing, the roof window comprises a covering, including flashing members (not shown), cladding and covering elements of which a frame side covering element 1*b* and sash side covering element 2*b* are shown.

From a closed position, the user operates the operating device of the window. The operating device typically comprises a handle (not shown) connected with the sash bottom member and/or, as shown here, an operating and locking assembly 4 including a ventilation flap at the sash top member with a lock mechanism to interact with a striking plate on the frame top member. The force, and hence moment, exerted by the user operating the operating device, is transferred to the hinge 10 which in turn exerts a moment on the sash 2, and the moment resulting from the weight of the sash 2 and pane 3 is overcome, along with any frictional forces present. All in all, the opening operation entails that the sash 2 is moved from a closed position to an open position as represented by FIG. 1, in which the sash plane forms an opening angle with the frame plane. Closing the window from the open position entails the opposite movement of the sash 2. It is possible to position the sash 2 in a number of arbitrary opening positions, in which the sash 2 is held stable relative to the frame 1. The sash 2 is also able to be rotated to allow cleaning of the outside of the pane 3 from the inside of the building in which the roof window is installed. Depending on the position of the hinge axis in the window, the sash 2 may be rotated substantially through 180°.

FIGS. 2 to 12

Referring now first to FIGS. 2 to 9, a first embodiment of a hinge 110 according to the invention will be described in detail.

Figure 2:
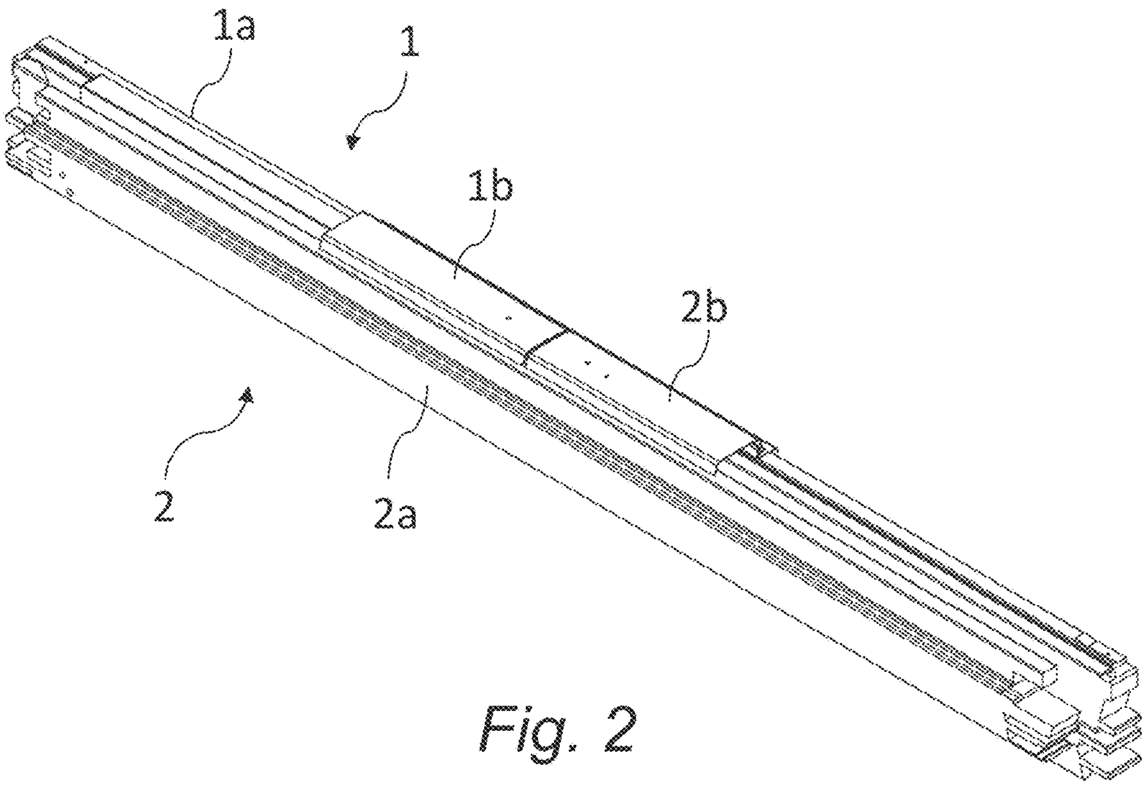
FIG. 2 is a partial perspective view of details of a roof window, including frame and sash side members, in an embodiment of the invention.
Figure 3:
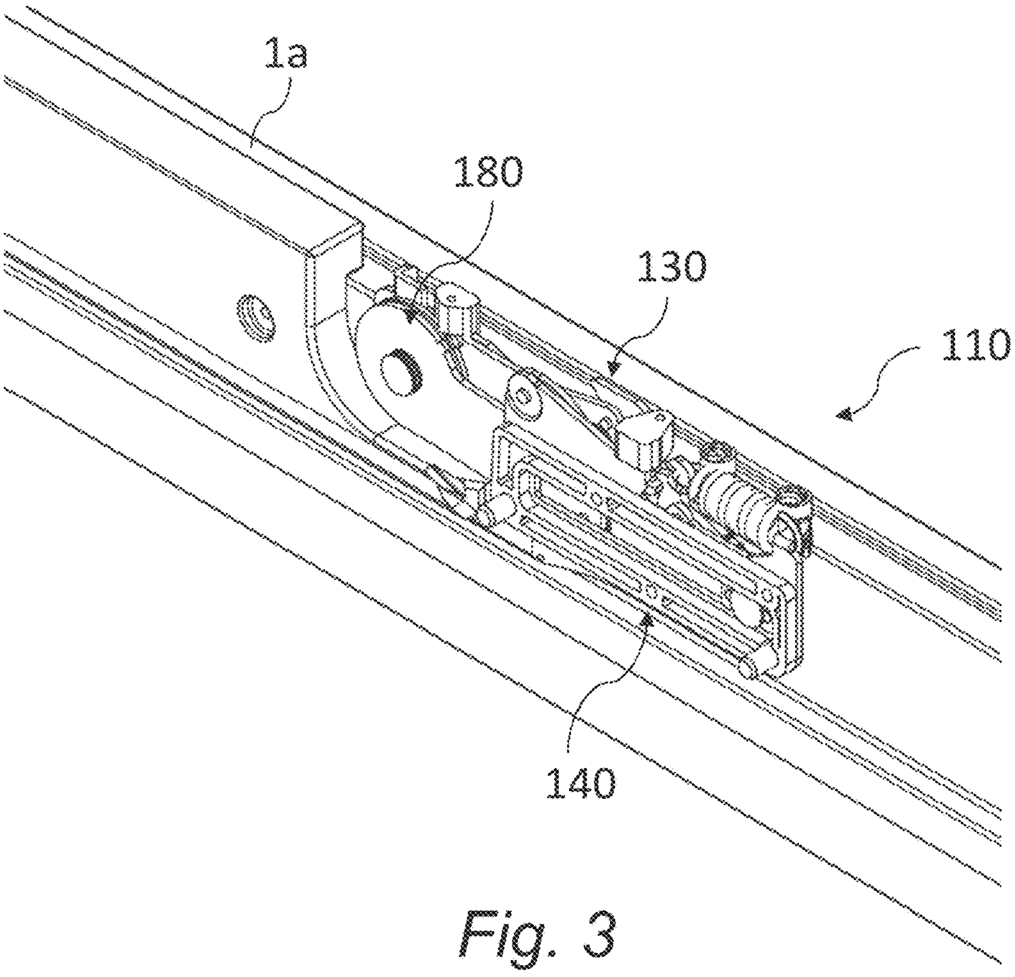
FIG. 3 is a partial perspective view of the frame side member of FIG. 2 and shows a hinge in a first embodiment of the invention.

In FIGS. 2 and 3, the hinge 110 is shown in a position corresponding to a closed position of the sash 2 relative to the frame 1. The roof window is represented by frame side member 1*a* and sash side member 2*a* in FIG. 2, and by only the frame side member 1*a* in FIG. 3, while other parts of the roof window have been omitted for ease of reading. The hinge 110 comprises a frame hinge part 130 and a sash hinge part 140 configured to assume an angle relative to the frame hinge part 130. The hinge 110 forms part of a set of hinges, of which the frame hinge part 130 of each hinge 110 is configured to be connected to the frame side member 1*a* of the frame 1 of the roof window in a mounted condition, at a location chosen to provide the desired position of the hinge axis a, and the sash hinge part 140 is correspondingly configured to be connected to the sash side member 2*a*.

Figure 4:
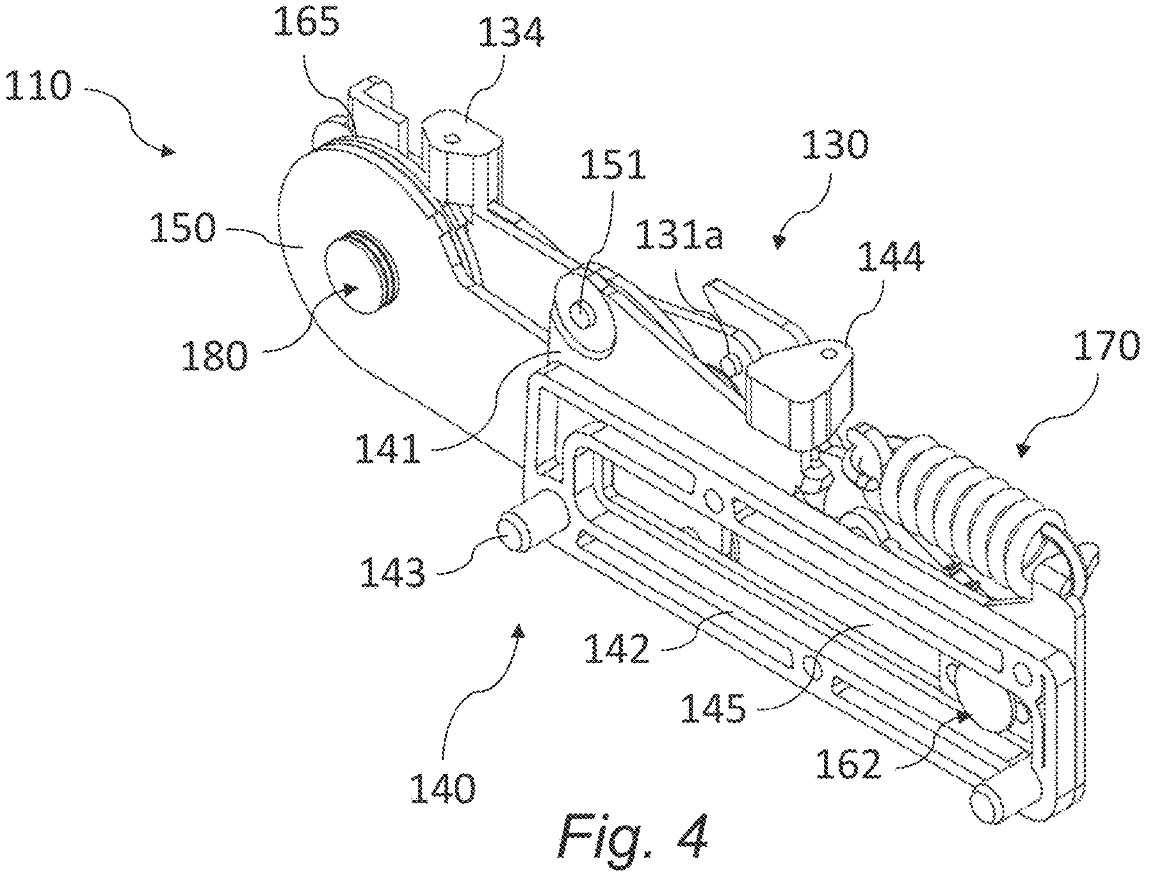
FIGS. 4 and 5 are perspective views of the hinge in the first embodiment of the invention.
Figure 5:
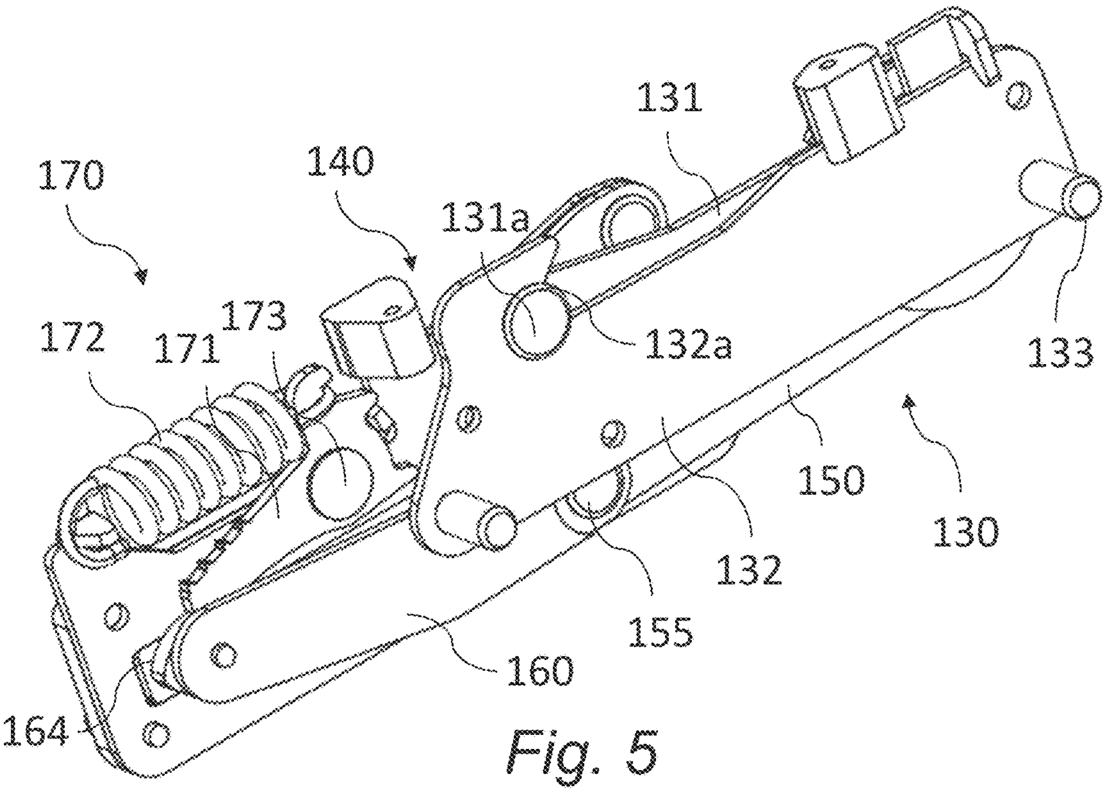
Figure 6:
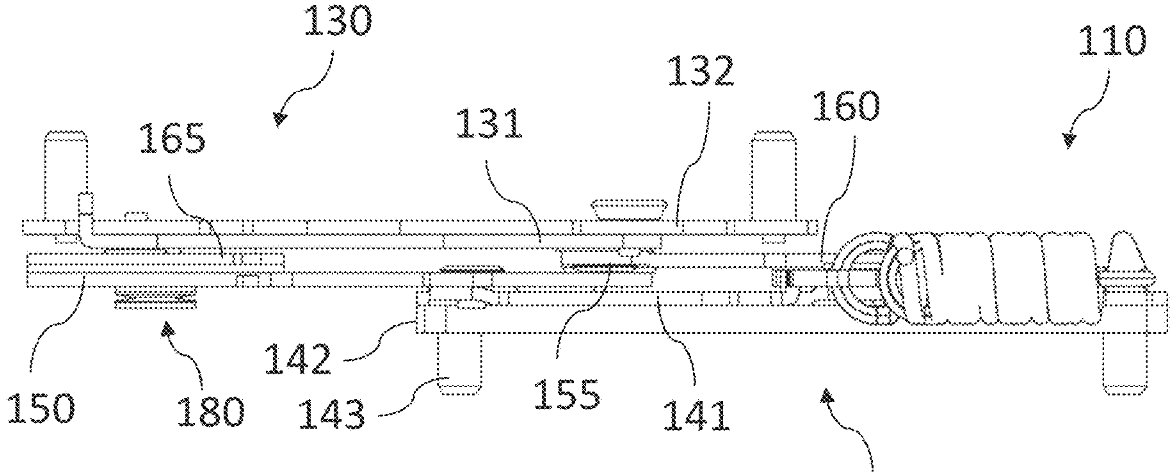
FIG. 6 is a view of the hinge of FIGS. 4 and 5 seen from the above.
Figure 7:
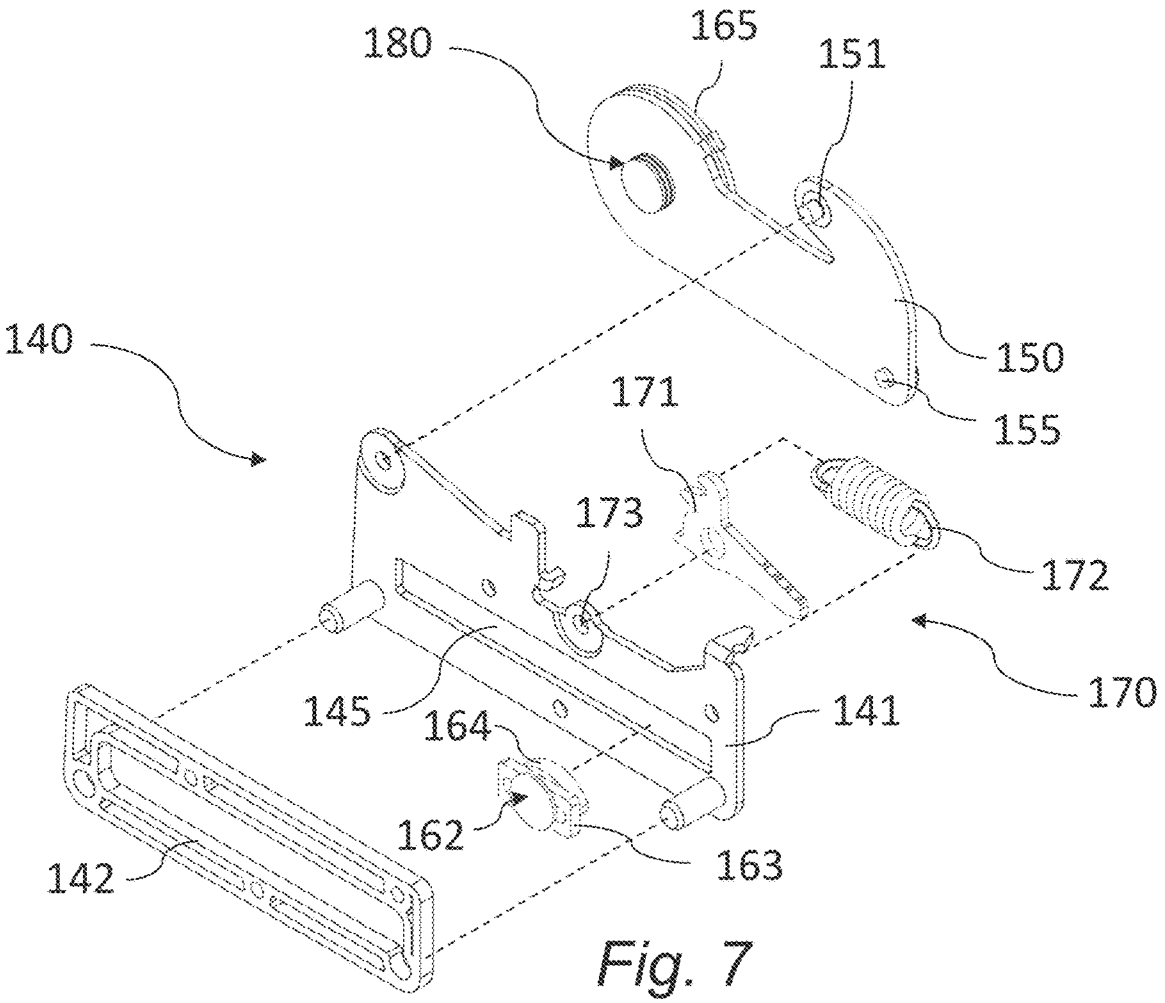
FIGS. 7, 8 and 9 are exploded perspective views of the details of FIGS. 4 and 5.
Figure 8:
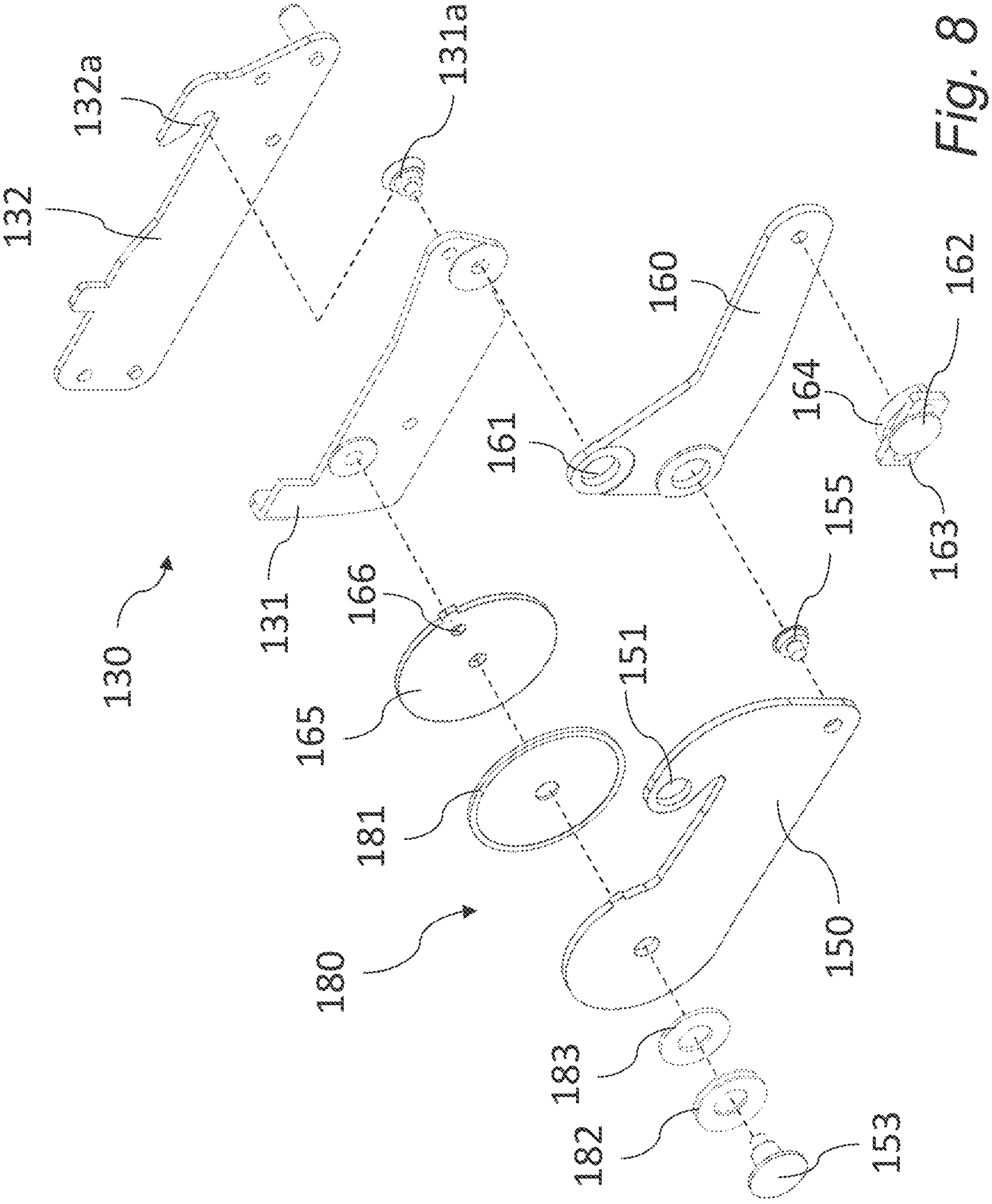
Figure 9:
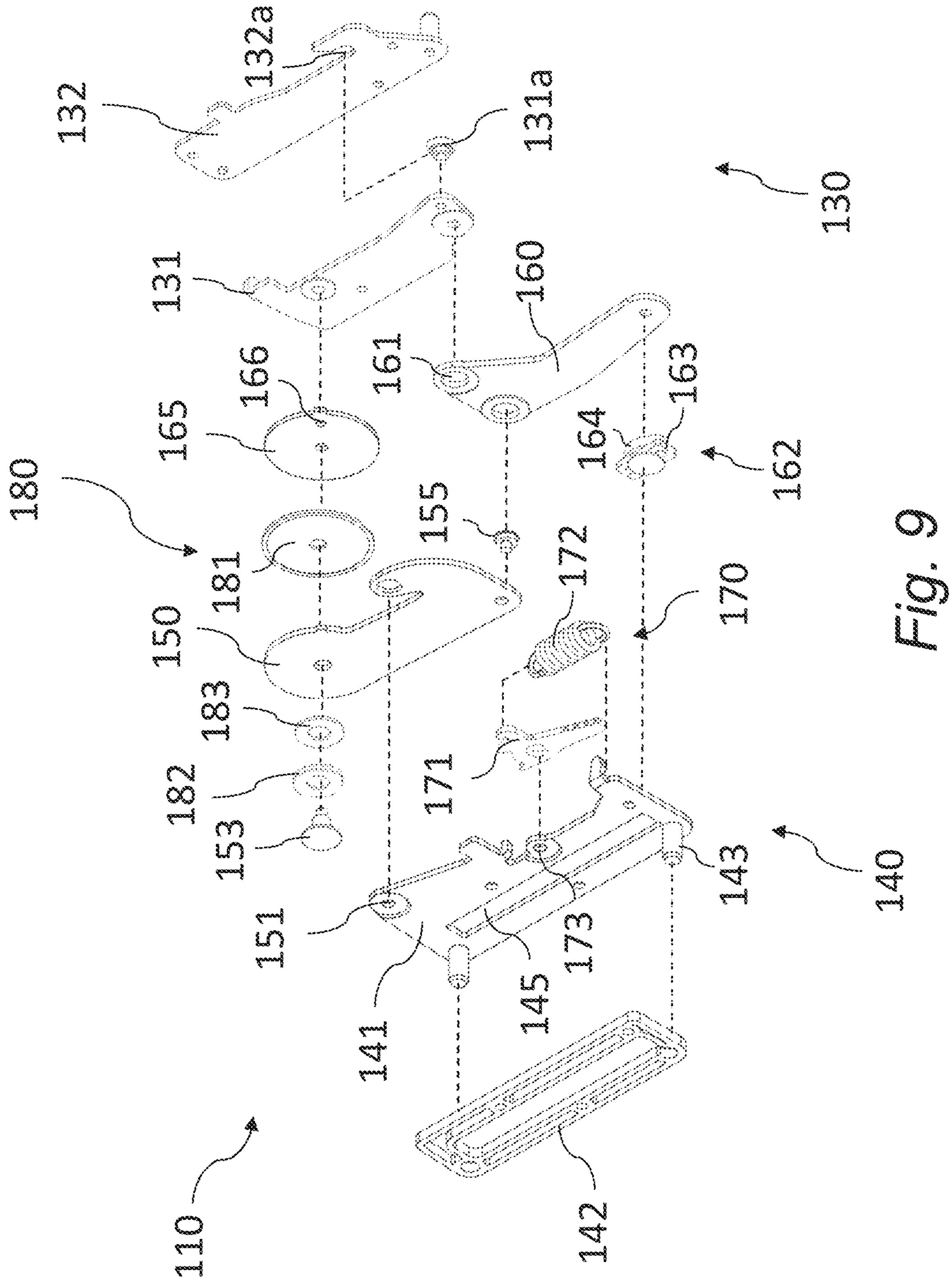

Turning now to FIGS. 4 and 5, a base plate 131 of the frame hinge part 130 defines a hinge plane substantially perpendicular to the hinge axis a of the window in the mounted condition of the hinge, and a base plate 141 of the sash hinge part 140 being is substantially parallel to the base plate 131 of the frame hinge part 130. The frame hinge part 130 has a receiver element 132 coupled to the base plate 131, the function of which will be described further below, and a distance piece 142 to keep the base plate 131 at an appropriate position relative to the frame side member 1*a*.

The frame hinge part 130 and the sash hinge part 140 comprise fastening means which can be for example pins or spigots 133, 143, or any type of threaded fastening means, for fastening to the frame side member 1*a* and sash side member 2*a*, respectively. The spigots 133, 143 are fixed on the receiver element 132 and the base plate 141 of the sash hinge part 140, respectively, such that sash-side spigots 143 protrude through the distance piece 142. The receiver element 132 is fastened to the frame side member 1*a* either in the supply condition or in a first step of installation, and the remaining components of the hinge 110 including the base plate 131 of the frame hinge part 130 are all connected to the sash 2.

Due to the configuration of the hinge 110, the sash link 150 and the frame link 160 are provided connected with each other by means of the bearing axle 155, and thus form a coherent structure constituting the "remaining components of the hinge 110".

Following correct positioning of the remaining components of the hinge 110 relative to the frame side member 1*a* with the receiver element 132, the base plate 131 of the frame hinge part 130 is brought into connection with the receiver element 132 in that a base plate rivet 131*a* is brought into engagement with a receiver element slot 132*a*.

The frame hinge part 130 and the sash hinge part 140 are furthermore provided with holding clips 134, 144 for connecting the covering elements 1*b*, 2*b* of the frame and sash side members 1*a*, 2*a*.

It is noted that during the entire opening and closure movement, the respective planes of the base plates 131, 141 of the frame hinge part 130 and the sash hinge part 140 are at all times kept substantially parallel, thus avoiding transverse movements perpendicular to the hinge plane as defined by the base plates 131, 141.

In order to render the necessary movement between the parts of the hinge possible, each hinge comprises a movement supporting assembly. The movement supporting assembly comprises guiding means configured to allow the sash hinge part 140 to assume an angle relative to the frame hinge part 130 substantially around the hinge axis a during an opening movement from a closed position to an open position and during a closing movement from the open position to the closed position. In the type of hinge according to the invention, the guiding means comprise a linkage mechanism including at least two links 150, 160 providing connection between the sash hinge part 140 and the frame hinge part 130, and each link is connected to at least one of the frame hinge part and the sash hinge part at a joint and connected to each other as will be described in the following for the first embodiment.

According to the invention, the linkage mechanism comprises two links, namely a sash link 150 and a frame link 160 providing connection between the sash hinge part 140 and the frame hinge part 130.

The frame link 160 is connected to the sash hinge part 140 in a sliding joint 162. The sliding joint 162 cooperates with a guide track 145. Here, the guide track 145 is provided in the sash hinge part 140, more specifically in the base plate 141 of the sash hinge part 140. The sliding joint may in principle comprise a pin or an axle, but is here formed as a sliding block 163. The sliding block 163 is connected to an engagement part 164. Suitable materials of the components of the sliding joint, and of other components of the hinge, are given in Applicant's above-mentioned WO 2017/076416 A1. The sliding connection may also include a pin and/or an axle, either alone or in combination with the sliding block.

The sash link 150 is connected to the frame hinge part 130 by means of an additional link 165 via a hinged joint 153. In turn, the additional link 165 is connected to the frame hinge part 130 at a hinged joint 166 located eccentrically relative to the hinged joint 153 forming the connection between the sash link 150 and the additional link 165.

The sash link 150 and the frame link 160 are connected to each other in a bearing axle 155.

Furthermore, the frame link 160 is connected to the frame hinge part 130 in a hinged joint 161, and the sash link 150 is connected to the sash hinge part 140 in a hinged joint 151.

A force transmission device 170 is provided for exerting lifting assistance to the movement of the sash 2 relative to the frame 1 during opening of the roof window in the mounted condition of the hinge 110. The force transmission device 170 is provided with biasing means, which in general may be selected from the group comprising leaf springs, torsion springs and tension/compression springs. In the embodiment shown, the biasing means is a tension spring 172. The tension spring 172 is connected to the base plate 141 of the sash hinge part 140 and acts on a pick-up 171 connected to the sash hinge part 140 in a hinged joint 173 such that the pick-up 171 acts on the sliding joint 162, at the engagement part 164 thereof.

Finally, the hinge 110 comprises a braking device 180 acting on an element of the movement supporting assembly over a part of the opening and/or closing movement. In its most simple form, the braking device 180 comprises a friction element configured to provide a frictional force on a link of the linkage mechanism and/or at a joint between the linkage mechanism and the frame hinge part.

In the shown first embodiment, the braking device 180 comprises a friction element in the form of a friction disc 181, biased by a plate spring 182 acting on the sash link 150 via a washer 183. The friction disc 181 is provided between the sash link 150 and the additional link 165. The friction disc 181 is made of a suitable material which is able to apply a braking force on the sash link 150 and consequently on the entire linkage mechanism. The person skilled in the art is aware of materials which are able to withstand wear over long periods of time, for instance suitable plastic materials.

Figure 10:
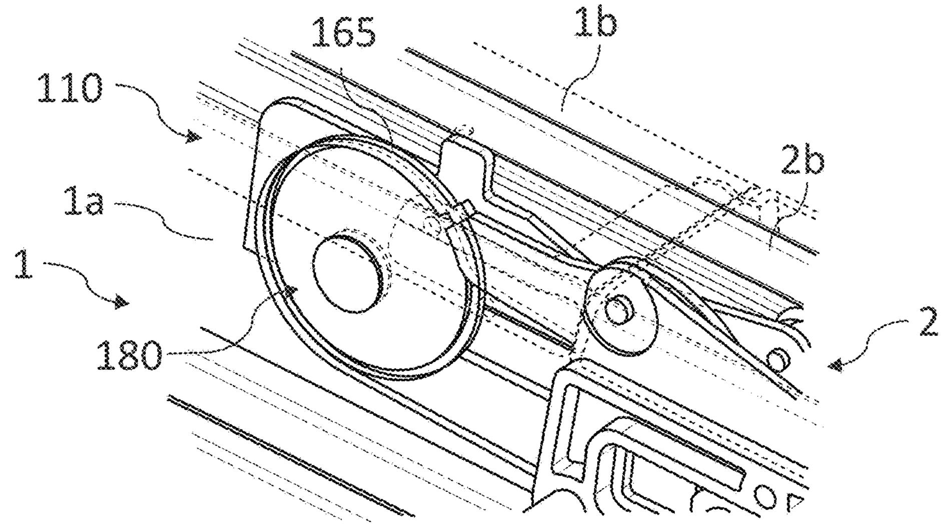
FIGS. 10 to 12 are partial side views showing a roof window in an embodiment of the invention with the hinge of the first embodiment, in three different positions of the sash relative to the frame.
Figure 11:
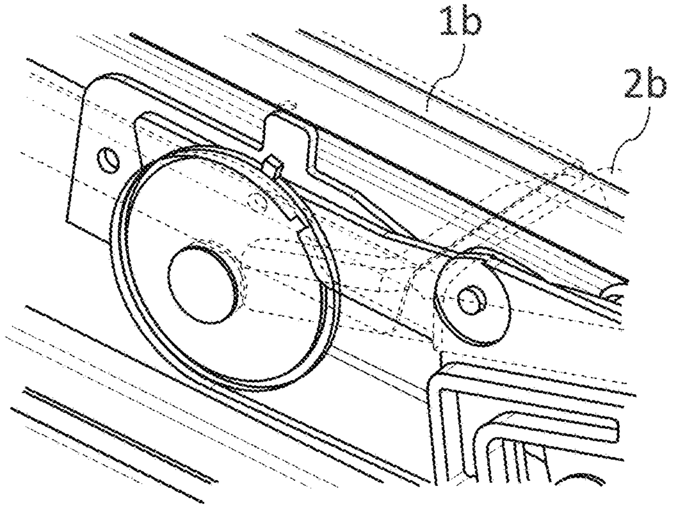
Figure 12:
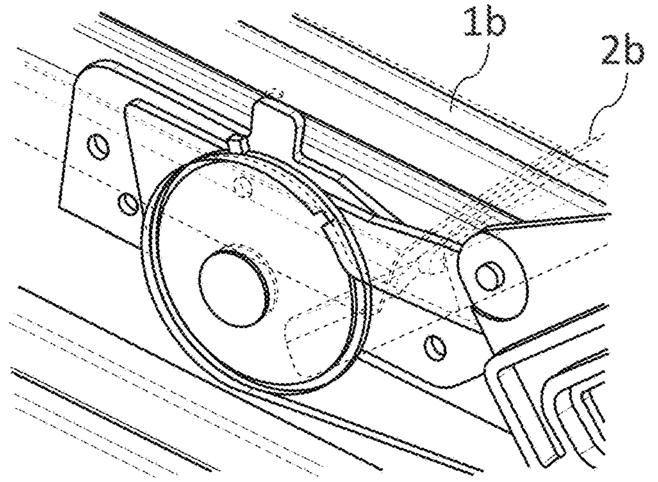
Figure 13:
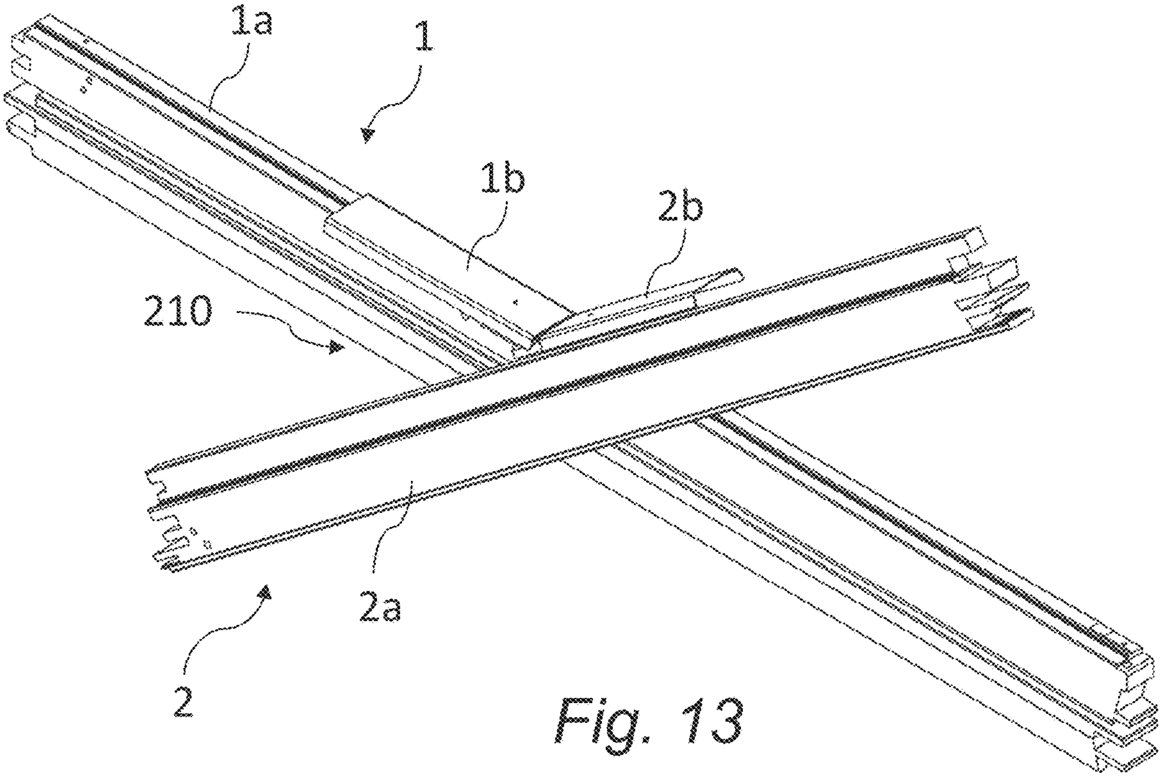
FIG. 13 is a partial perspective view of details of a roof window, including frame and sash side members, in an open position of the sash relative to the frame and with a hinge in a second embodiment of the invention.
Figure 14:
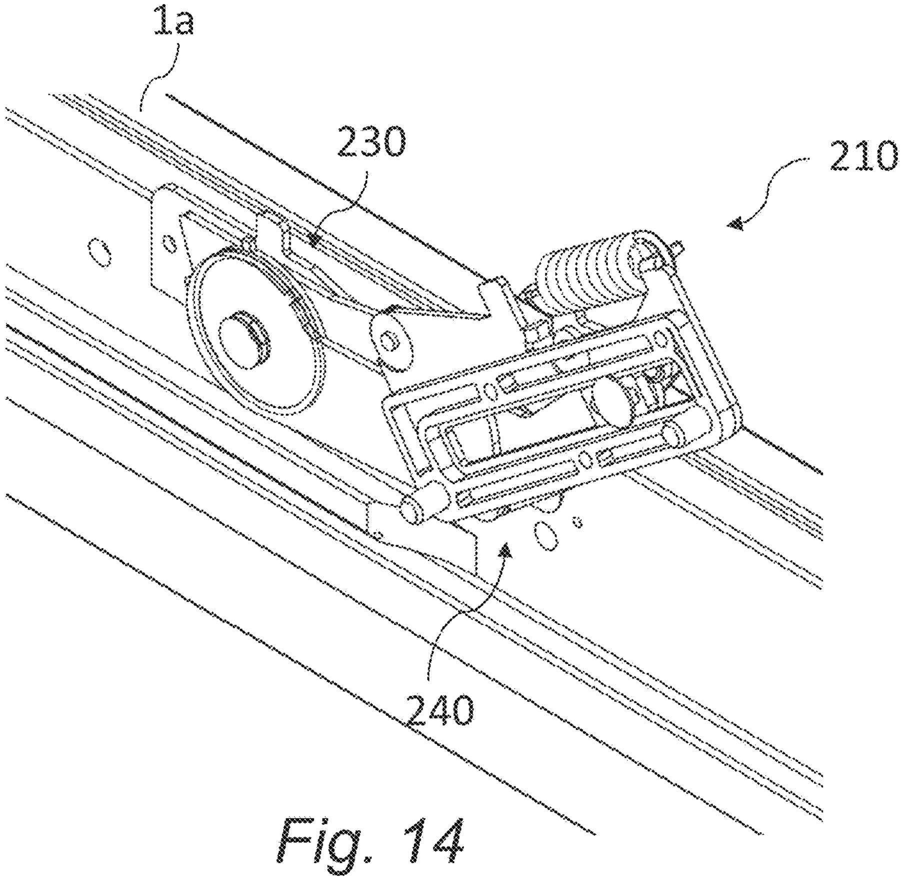
FIG. 14 is a partial perspective view of the frame side member of FIG. 13, including the hinge of the second embodiment of the invention.
Figure 15:
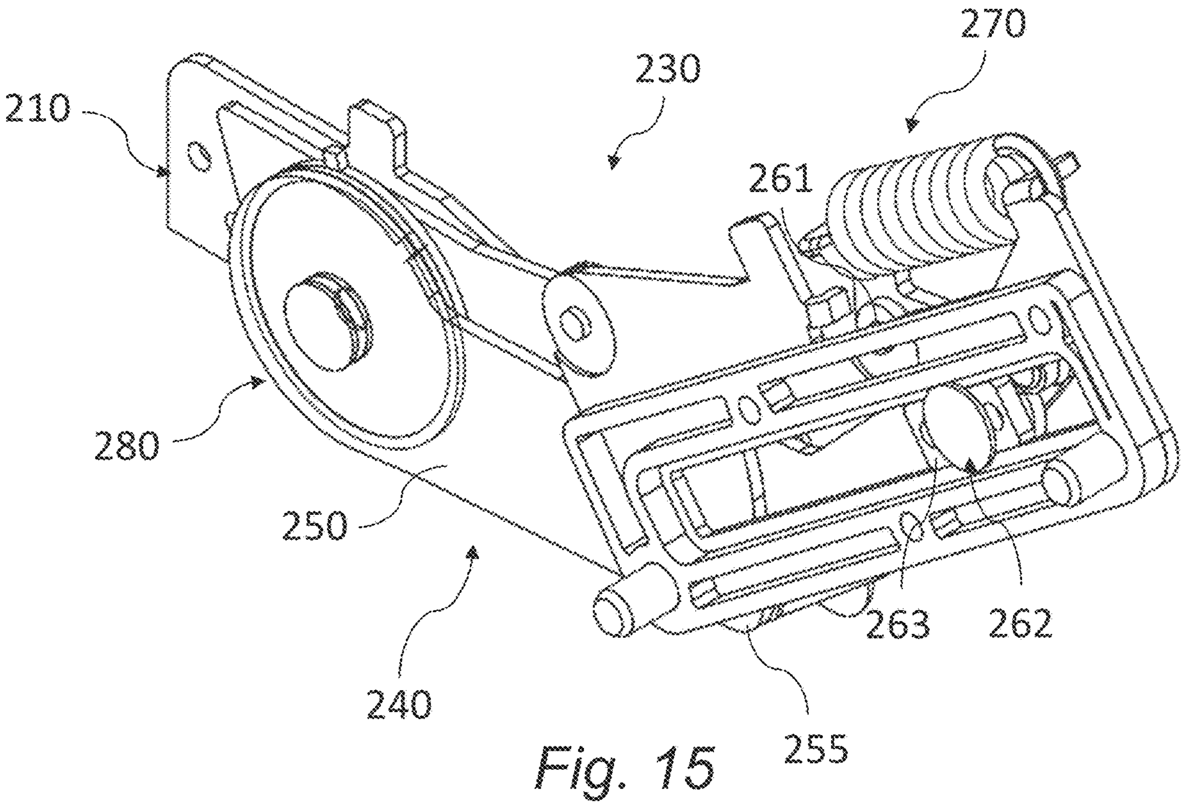
FIGS. 15 and 16 are perspective views of the hinge in the second embodiment of the invention.
Figure 16:
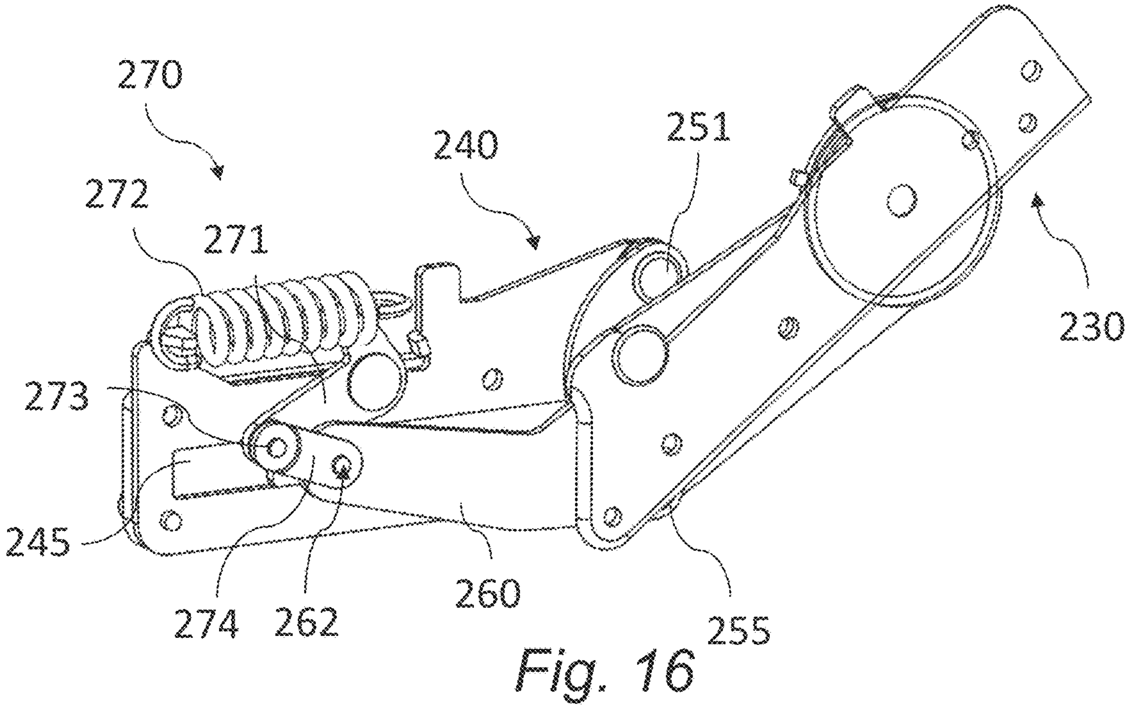

Turning now to FIGS. 10 to 12, a sequence of positions during the opening movement of the hinge 110 and thus of the sash 2 relative to the frame 1 of the entire roof window is shown.

From the closed position shown in FIG. 10, the sash 2 is rotated relative to the frame 1 when the user operates the operating device. The particular movement pattern of the linkage mechanism of the guiding means ensures that the sash side covering element 2*b* moves out of engagement with the frame side covering element 1*b* without conflict into an open position as represented by FIG. 11 or FIG. 12. The force transmission device 170 assists during the lifting operation, and the braking device 180 is configured such that it modulates the movement of the sash hinge part 140 relative to the frame hinge part 130, and thus of the entire sash 2 relative to the frame 1 in order to keep any exaggerated movement in check.

FIGS. 13 to 16

Turning now to the remaining Figures of the drawings, it is again noted that elements having the same or analogous function are denoted by the same reference numerals as in the first embodiment, to which 100, 200 . . . has been added. Only differences will be described in detail.

In a second embodiment, the force transmission device 270 of the hinge 210 comprises a pick-up 271 connected to the sash hinge part 240 in a hinged joint 273 and configured to act on the sliding joint 262 via a separate pick-up link 274. This provides for an alternative set-up of the force transmission device 270.

Figure 17:
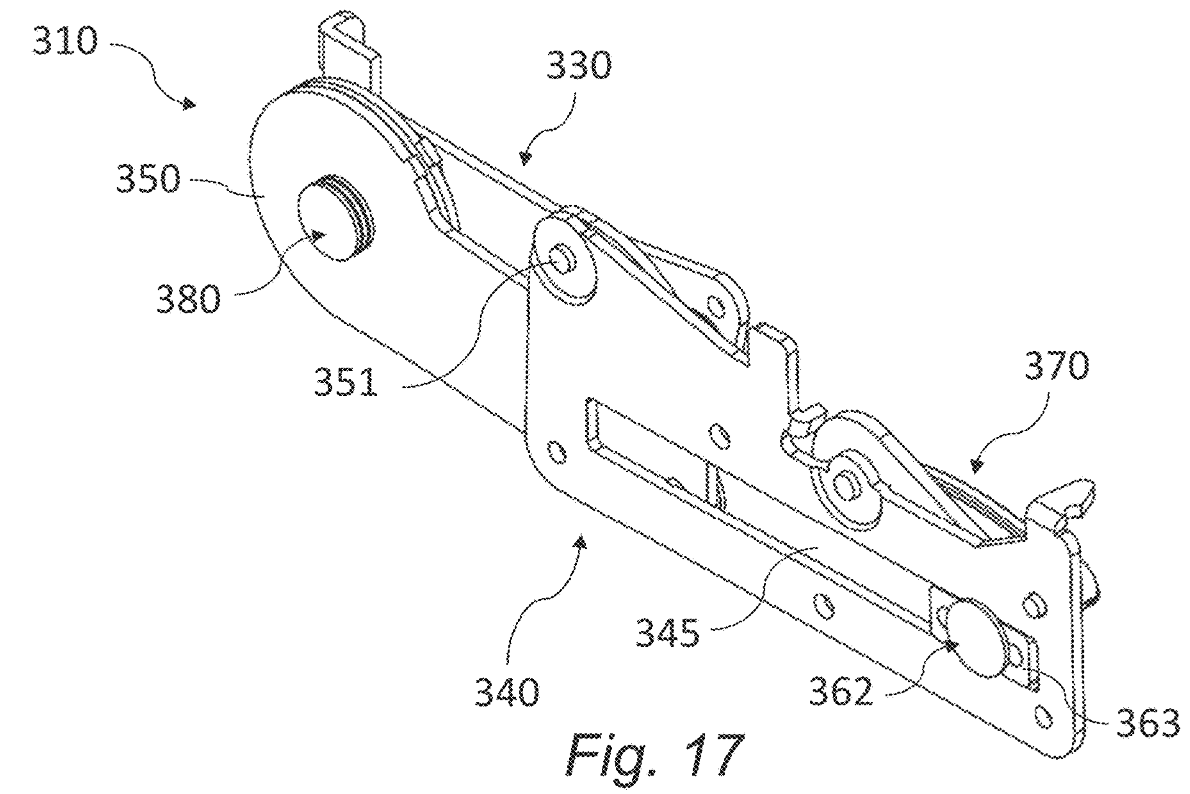
FIGS. 17 and 18 are perspective views of the hinge in a third embodiment of the invention.
Figure 18:
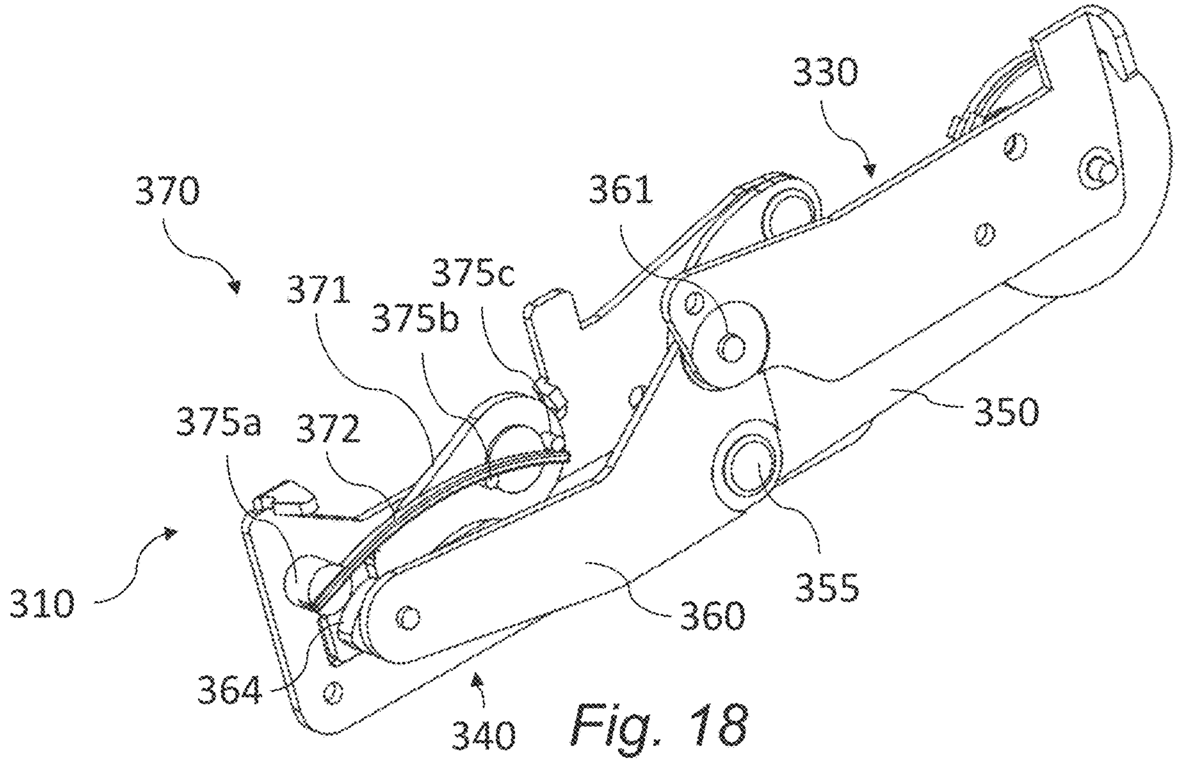

FIGS. 17 to 18

In a third embodiment, the pick-up 371 of the force transmission device 370 of the hinge 310 is biased by a leaf spring 372. The leaf spring 372 is fixated by a fastening protrusion 375*a* and a first abutment protrusion 375*b* and a second abutment protrusion 375*c* provide for the bias of the pick-up 371. Leaf springs have suitable biasing properties and are easy to handle and mount.

Figure 19:
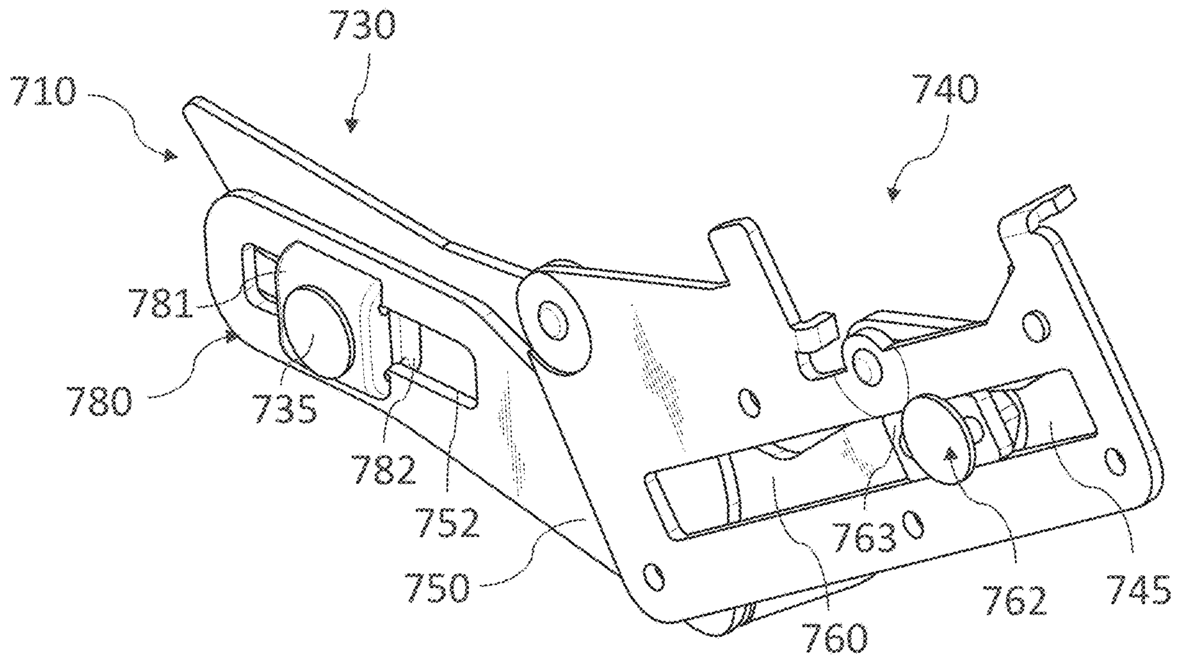
FIGS. 19 and 20 are perspective views of the hinge in a further embodiment of the invention.
Figure 20:
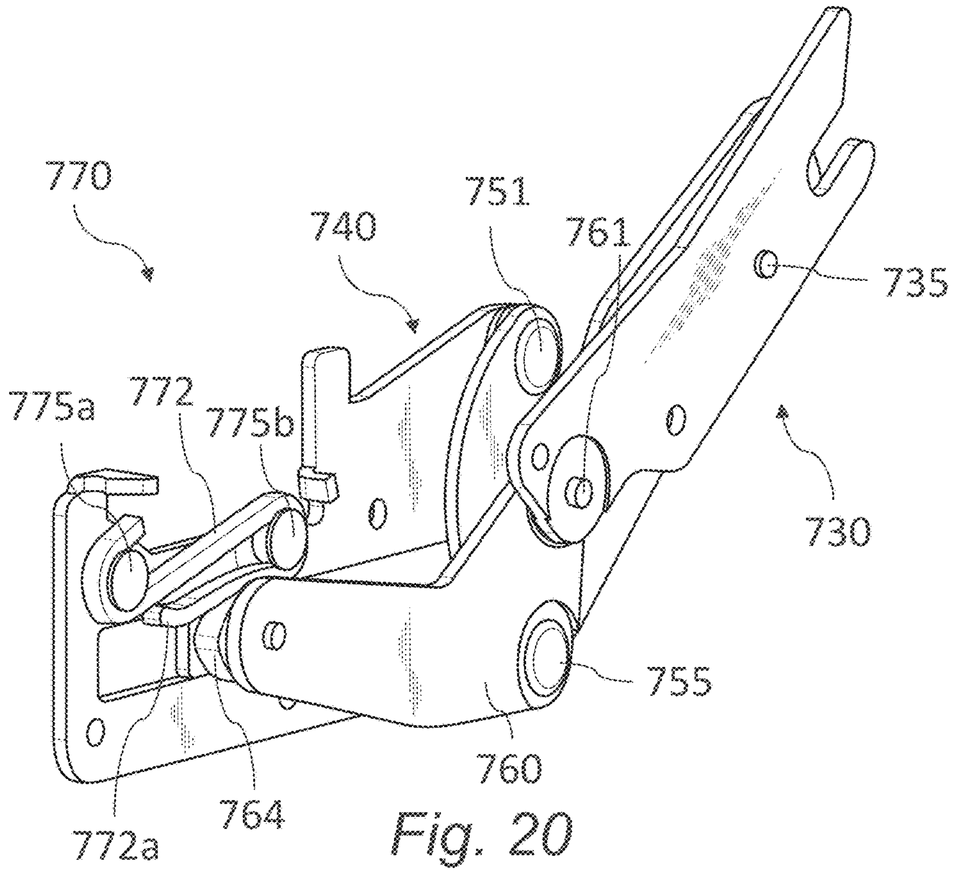
Figure 21:
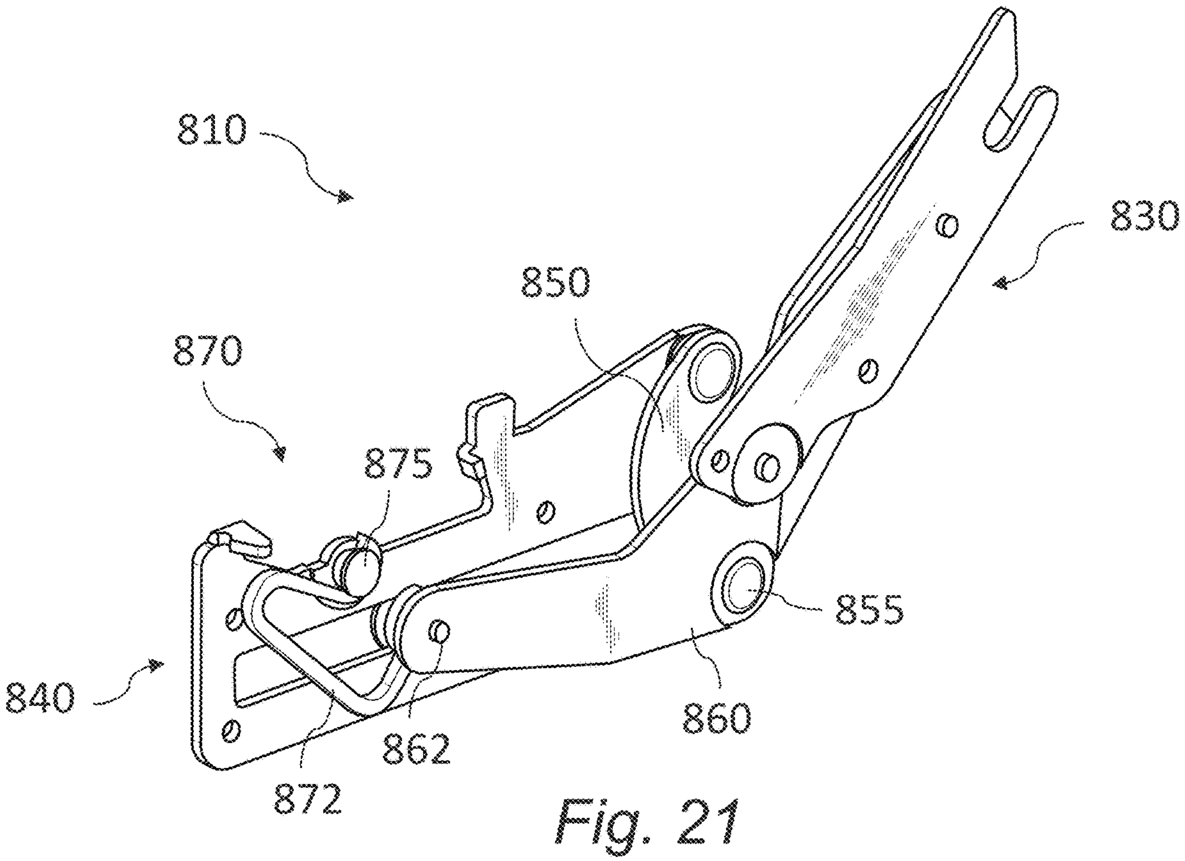
FIG. 21 is a perspective view of the hinge in an alternative embodiment of the invention.

FIGS. 19 to 20

In a further embodiment, a guide track 752 is provided in the sash link 750, and the sliding joint 735 is provided on the frame hinge part 730 of the hinge 710.

The friction element of the braking device 780 comprises two squeeze blocks 781, 782. The squeeze blocks 781, 782 are provided in connection with the sliding joint 735 and interact with the sash link 750 at the guide track 752 therein. Alternatively, a single squeeze block may be provided. The provision of squeeze blocks has proven to function well as an alternative braking solution.

A leaf spring 772 acts directly on the sliding joint 762. Specifically, the leaf spring 772 acts on the engagement part 764 connected to the sliding block 763 of the sliding joint 762. The leaf spring 772 is formed substantially as an S-shaped hook.

The force transmission device 770 comprises an engagement portion 772*a* of the leaf spring, as well as a first fastening protrusion 775*a* and a second fastening protrusion 775*b*. The leaf spring 772 attaches to the two fastening protrusions 775*a* and 775*b*.

FIG. 21

In an alternative embodiment similar to the one shown in FIG. 20, the force transmission device 870 comprises a fastening protrusion 875, which a leaf spring 872 is attached to. The leaf spring 872 acts directly on a sliding joint 862.

The frame link 860 is connected to the sash hinge part 840 in the sliding joint 862 and the sash link 850 is connected to the frame hinge part 830.

The sash link 850 provides connection between the bearing axle 855 and the frame hinge part 830, and the frame link 860 provides connection between the bearing axle and the sash hinge part 840. The two links of the linkage mechanism are connected to each other in the bearing axle 855.

Figure 22:
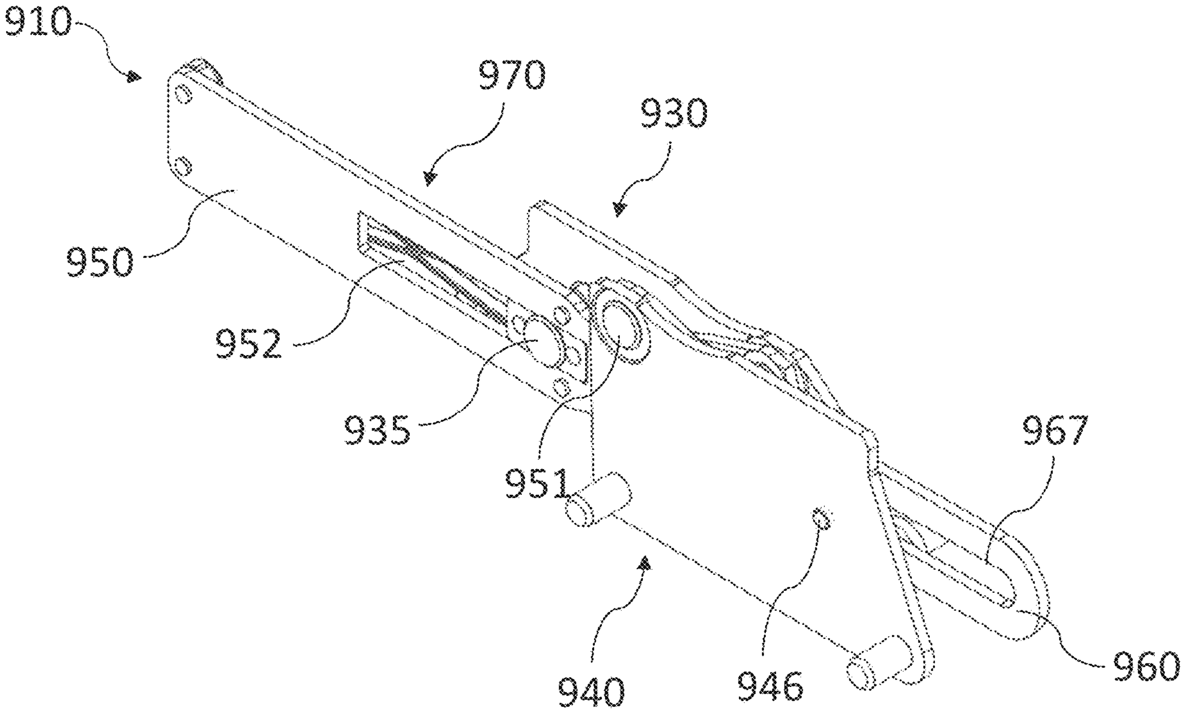
FIGS. 22 and 23 are perspective views of the hinge in a still further embodiment of the invention.
Figure 23:
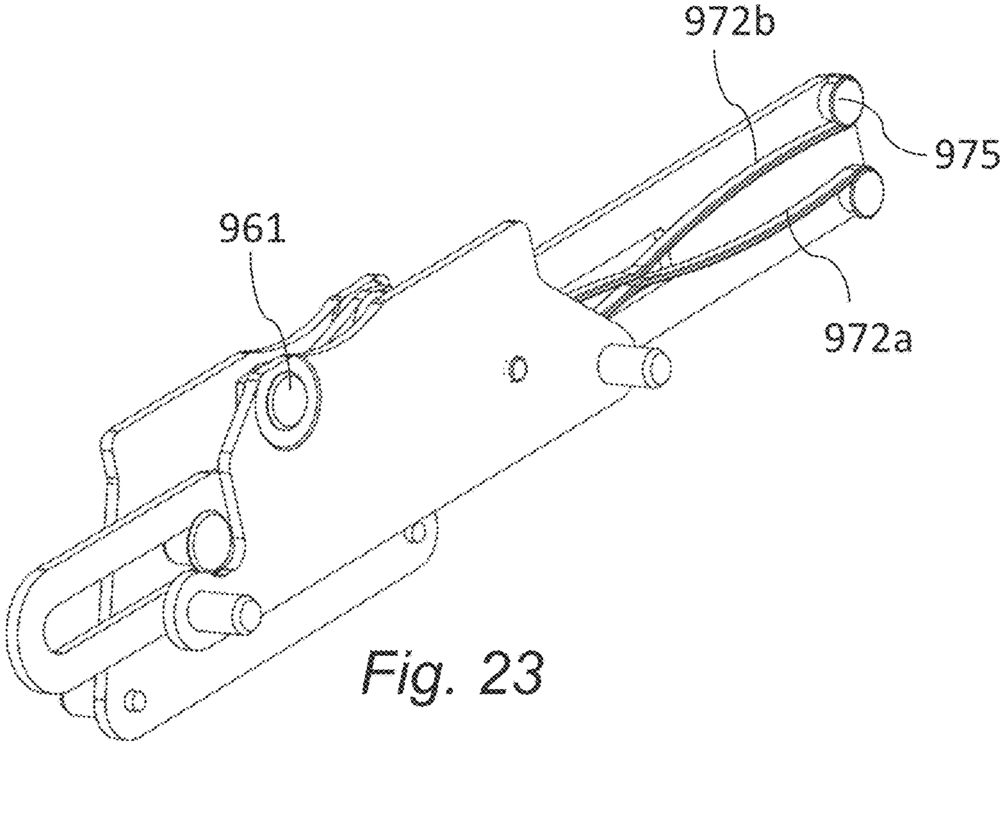
Figure 24:
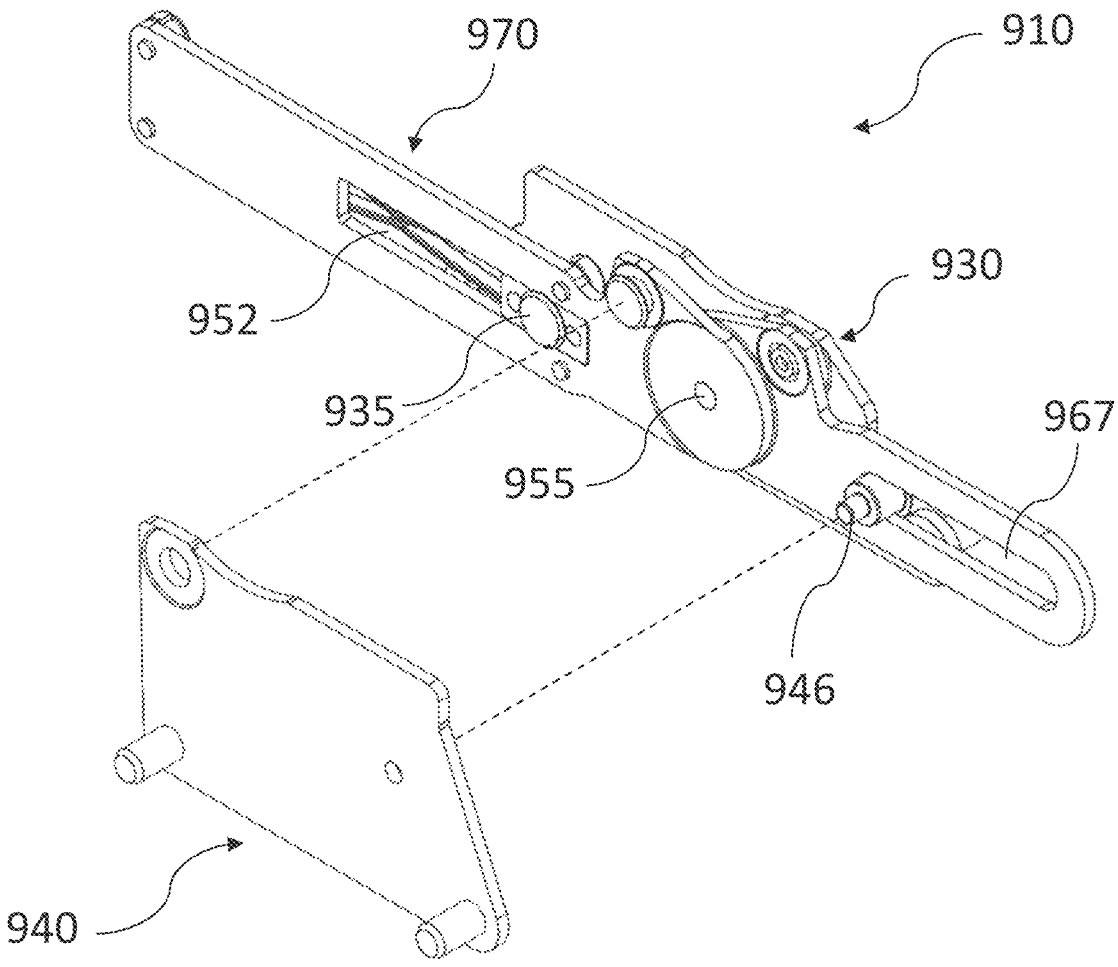
FIG. 24 is an exploded perspective view of the details of the hinge in the still further embodiment of the invention shown in FIGS. 22 and 23.

FIGS. 22 to 24

In a still further embodiment shown in FIGS. 22-24, the force transmission device 970 is biased by two leaf springs 972*a*, 972*b*, positioned oppositely. A protrusion 975 is comprised at an end of each leaf spring 972*a*, 972*b*.

The frame link 960 is connected to the frame hinge part 930 in a hinged joint 961. The sash link 950 is connected to the sash hinge part 940 in a hinged joint 951.

A guide track 967, 952 is provided in the sash link 960 and the frame link 950, respectively. A sliding joint 935 is provided on the frame hinge part 930 and the sash hinge part 940.

Non-Shown Embodiments

The hinge of the embodiments described in the above is also applicable in roof windows which are top-hinged during normal operation and which pivots for cleaning. It is understood that in such a roof window, the stationary frame 1 constitutes a primary frame, and the sash 2 functions as a first secondary frame and an intermediate frame functions as a second secondary frame. The intermediate frame is fastened to the stationary frame at a top mounting fitting and the sash is hinged at the top of the roof window, via the intermediate frame to the stationary frame, to render the roof window top-hinged during normal operation. The sash is also pivotally connected to the intermediate frame in order to be able to rotate the sash to provide access to the exterior of the pane, for instance for cleaning purposes. To that end, the intermediate frame is provided with a frame hinge part of the hinge and the sash with the counterpart sash hinge part.

The invention is not limited to the embodiments shown and described in the above, but various modifications and combinations may be carried out.

LIST OF REFERENCE NUMERALS

- 1 frame
  - 1*a* frame side member
  - 1*b* frame side covering element
- 2 sash
  - 2*a* sash side member
  - 2*b* sash side covering element
- 3 pane
- 4 operating and locking assembly
- α hinge axis
- 10 hinge
- 110 hinge
- 130 frame hinge part
  - 131 base plate
  - 131*a* base plate rivet
  - 132 receiver element
  - 132*a* receiver element slot
  - 133 spigot
  - 134 holding clip
- 140 sash hinge part
  - 141 base plate
  - 142 distance piece
  - 143 spigot
  - 144 holding clip
  - 145 guide track

150 sash link
151 hinged joint (to base plate 141)
153 hinged joint (to additional link 165)
155 bearing axle
160 frame link
161 hinged joint (to base plate 131)
162 sliding joint (to guide track 145)
163 sliding block
164 engagement part
165 additional link
166 hinged joint of friction link 165 (to base plate 131)
170 force transmission device
171 pick-up
172 spring
173 hinged joint
180 braking device
181 friction disc
182 plate spring
183 washer
210 hinge
230 frame hinge part
240 sash hinge part
245 guide track
250 sash link
251 hinged joint
255 bearing axle
260 frame link
261 hinged joint (to base plate 231)
262 sliding joint (to guide track 245)
263 sliding block
270 force transmission device
271 pick-up
272 spring
273 hinged joint
274 pick-up link
280 braking device
310 hinge
330 frame hinge part
340 sash hinge part
345 guide track
350 sash link
351 hinged joint
355 bearing axle
360 frame link
361 hinged joint
362 sliding joint (to guide track 345)
363 sliding block
364 engagement part
370 force transmission device
371 pick-up
372 leaf spring
375*a* fastening protrusion (for leaf spring 372)
375*b* first abutment protrusion
375*c* second abutment protrusion
380 braking device
710 hinge
730 frame hinge part
735 sliding joint
740 sash hinge part
745 guide track
750 sash link
751 hinged joint
752 guide track (to sliding joint 735)
755 bearing axle
760 frame link
761 hinged joint
762 sliding joint (to guide track 745)
763 sliding block
764 engagement part
770 force transmission device
772 leaf spring
772*a* engagement portion of leaf spring
775*a* first fastening protrusion
775*b* second fastening protrusion
780 braking device
781 first squeeze block
782 second squeeze block
810 hinge
830 frame hinge part
840 sash hinge part
850 sash link
855 bearing axle
860 frame link
862 sliding joint
870 force transmission device
872 leaf spring
875 fastening protrusion
910 hinge
930 frame hinge part
935 sliding joint
940 sash hinge part
946 sliding joint
950 sash link
951 hinged joint
952 guide track
955 bearing axle
960 frame link
961 hinged joint
967 guide track
970 force transmission device
972*a* leaf spring
972*b* leaf spring
975 protrusion

The invention claimed is:

1. A hinge for a roof window with a stationary primary frame having a plurality of frame members including at least two opposing side members, and at least one secondary frame including a sash having a plurality of sash members including at least two opposing side members, said hinge being configured to be connected to the stationary primary frame and to the secondary frame sash to define a hinge axis of the roof window, said hinge comprising a frame hinge part, a sash hinge part, and a movement supporting assembly comprising guiding means configured to allow the sash hinge part to assume an angle relative to the frame hinge part substantially around said hinge axis during an opening movement from a closed position to an open position and during a closing movement from the open position to the closed position, the guiding means comprising a linkage mechanism including at least two links providing connection between the sash hinge part and the frame hinge part, each link of the at least two links being connected to at least one of the frame hinge part and the sash hinge part at a joint and the at least two links being connected to each other, the frame hinge part comprising a base plate defining a hinge plane substantially perpendicular to the hinge axis of the roof window and the sash hinge part comprising a base plate substantially parallel to the base plate of the frame hinge part, the at least two links of the linkage mechanism are connected to each other by a bearing axle and the at least two links comprise a sash link providing a connection between the bearing axle and the frame hinge part, and a frame link providing a connection between the bearing axle and the sash hinge part, a force transmission device is provided for exerting lifting assistance to the movement of the sash relative to the stationary primary frame during opening of the roof window in the mounted condition of the hinge, and that said force transmission device is provided with biasing means, wherein the biasing means of the force transmission device comprises at least one leaf spring, wherein the frame link is connected to the sash hinge part in a sliding joint, wherein the force transmission device comprises at least one pick-up connected to the sash hinge part in a hinged joint and configured to act on the sliding joint, wherein said pick-up is biased by the at least one leaf spring, said at least one leaf spring being connected to the sash hinge part by means of a fastening protrusion, and said at least one leaf spring being connected to the pick-up by a first abutment protrusion and a second abutment protrusion.

2. The hinge according to claim 1, wherein the force transmission device is connected to a respective one of the frame hinge part and the sash hinge part.

3. The hinge according to claim 1, wherein each sliding joint cooperates with a guide track.

4. The hinge according to claim 3, wherein the guide track is provided in the respective sash hinge part or frame hinge part.

5. The hinge according to claim 4, wherein the guide track is provided in the base plate of the respective sash hinge part or frame hinge part.

6. The hinge according to claim 1, wherein the sliding joint comprises a pin, axle and/or a sliding block, said sliding block being connected to an engagement part.

7. The hinge according to claim 1, wherein the frame link is connected to the frame hinge part in a hinged joint and/or the sash link is connected to the sash hinge part in a hinged joint.

8. The hinge according to claim 1, wherein the hinge comprises a braking device acting on at least one element of the movement supporting assembly over at least a part of the opening and/or closing movement, and that the braking device comprises at least one friction element.

9. A roof window having a set of the hinges of claim 1, the roof window comprising:

a stationary primary frame having a plurality of frame members including at least two opposing side members, at least one secondary frame including a sash having a plurality of sash members including at least two opposing side members, and the set of the hinges being connected to the stationary primary frame and to the sash to define a hinge axis of the roof window, the frame hinge part of each hinge of the set of the hinges being connected to one of said frame side members of the stationary primary frame or to side members of the intermediate frame, and the sash hinge part of each hinge of the set of the hinges being connected to one of said sash side members.

10. A hinge for a roof window with a stationary primary frame having a plurality of frame members including at least two opposing side members, and at least one secondary frame including a sash having a plurality of sash members including at least two opposing side members and an intermediate frame, said hinge being configured to be connected to one of the stationary primary frame and the intermediate frame and said hinge further being configured to be connected to the secondary frame sash to define a hinge axis of the roof window, said hinge comprising a frame hinge part, a sash hinge part, and a movement supporting assembly comprising guiding means configured to allow the sash hinge part to assume an angle relative to the frame hinge part substantially around said hinge axis during an opening movement from a closed position to an open position and during a closing movement from the open position to the closed position, the guiding means comprising a linkage mechanism including at least two links providing connection between the sash hinge part and the frame hinge part, each link of the at least two links being connected to at least one of the frame hinge part and the sash hinge part at a joint and the at least two links being connected to each other, the frame hinge part comprising a base plate defining a hinge plane substantially perpendicular to the hinge axis of the roof window and the sash hinge part comprising a base plate substantially parallel to the base plate of the frame hinge part, the at least two links of the linkage mechanism are connected to each other by a bearing axle and the at least two links comprise a sash link providing a connection between the bearing axle and the frame hinge part, and a frame link providing a connection between the bearing axle and the sash hinge part, a force transmission device is provided for exerting lifting assistance to the movement of the sash relative to the stationary primary frame during opening of the roof window in the mounted condition of the hinge, and that said force transmission device is provided with biasing means, wherein the biasing means of the force transmission device comprises at least one leaf spring, wherein the frame link is connected to the sash hinge part in a sliding joint, wherein the force transmission device comprises at least one pick-up connected to the sash hinge part in a hinged joint and configured to act on the sliding joint, wherein said pick-up is biased by the at least one leaf spring, said at least one leaf spring being connected to the sash hinge part by means of a fastening protrusion, and said at least one leaf spring being connected to the pick-up by a first abutment protrusion and a second abutment protrusion.

11. A roof window having a set of the hinges of claim 10, the roof window comprising:

a stationary primary frame having a plurality of frame members including at least two opposing side members, at least one secondary frame including a sash having a plurality of sash members including at least two opposing side members, and an intermediate frame, and the set of the hinges being connected to one of the stationary primary frame and the intermediate frame and the set of the hinges being further connected to the sash to define a hinge axis of the roof window, the frame hinge part of each hinge of the set of the hinges being connected to one of said frame side members of the stationary primary frame or to side members of the intermediate frame, and the sash hinge part of each hinge of the set of the hinges being connected to one of said sash side members.

* * * * *